(12) United States Patent
Lilenfeld

(10) Patent No.: US 6,819,557 B2
(45) Date of Patent: Nov. 16, 2004

(54) ERGONOMIC STYLUS STORABLE IN THE PEN SLOT OF A PERSONAL DIGITAL ASSISTANT

(76) Inventor: David Michael Lilenfeld, 424 Lindbergh Dr. #305, Atlanta, GA (US) 30305

( * ) Notice: Subject to any disclaimer, the term of this patent is extended or adjusted under 35 U.S.C. 154(b) by 0 days.

(21) Appl. No.: 10/656,591

(22) Filed: Sep. 8, 2003

(65) Prior Publication Data

US 2004/0145579 A1 Jul. 29, 2004

Related U.S. Application Data

(63) Continuation-in-part of application No. 10/352,358, filed on Jan. 24, 2003.

(51) Int. Cl.$^7$ .................................................. G06F 1/16
(52) U.S. Cl. ........................ 361/686; 345/179; 401/258
(58) Field of Search .............................. 361/686; 401/5, 401/6, 7, 48, 107, 258; 345/179; D14/342, 411

(56) References Cited

U.S. PATENT DOCUMENTS

| | | | | |
|---|---|---|---|---|
| 336,540 A | * | 2/1886 | Wyttenbach | 15/443 |
| 4,127,338 A | * | 11/1978 | Laybourne | 401/8 |
| 5,885,018 A | * | 3/1999 | Sato | 401/8 |
| 6,225,988 B1 | * | 5/2001 | Robb | 345/179 |
| 6,626,598 B2 | * | 9/2003 | Schneider | 401/8 |
| 6,637,962 B1 | * | 10/2003 | Roche et al. | 401/7 |

* cited by examiner

Primary Examiner—Dean A. Reichard
Assistant Examiner—Carmelo Oliva

(57) ABSTRACT

An ergonomic stylus for a personal digital assistant, a tablet PC or other computer with a pen-based interface, with a body consisting of a tip and two or more arms. The arms reflexively assume an open position when removed from the pen slot of the pen-based computer and thereby provides the user with an ergonomic gripping area. The arms assume a closed position for storage in the pen slot in the PDA or other pen-based computer. It is therefore the primary object of the current invention to provide users of pen-based computers with a single device which is both comfortable for use over a prolonged period and which is storable in the pen slot of the pen-based computer.

11 Claims, 15 Drawing Sheets

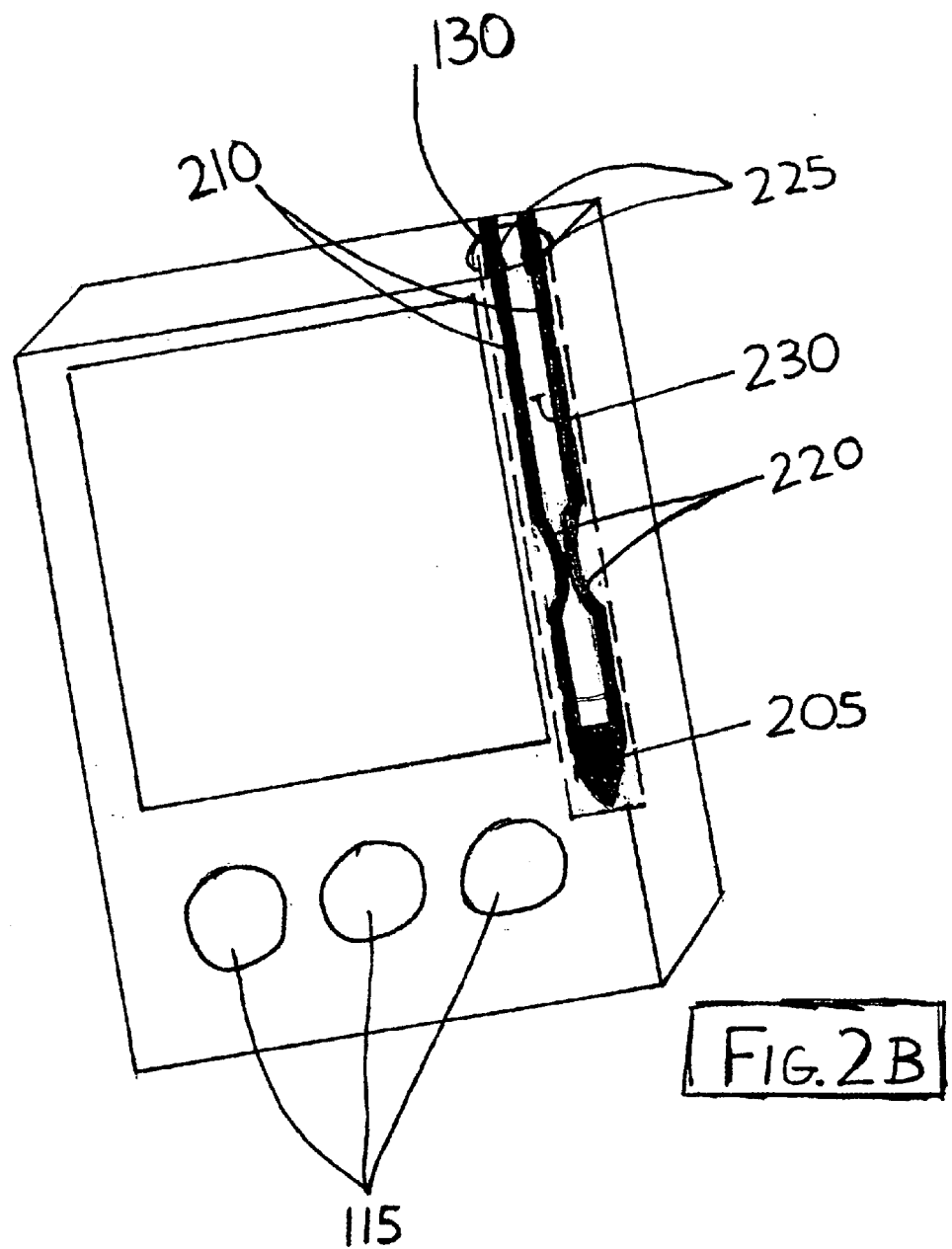

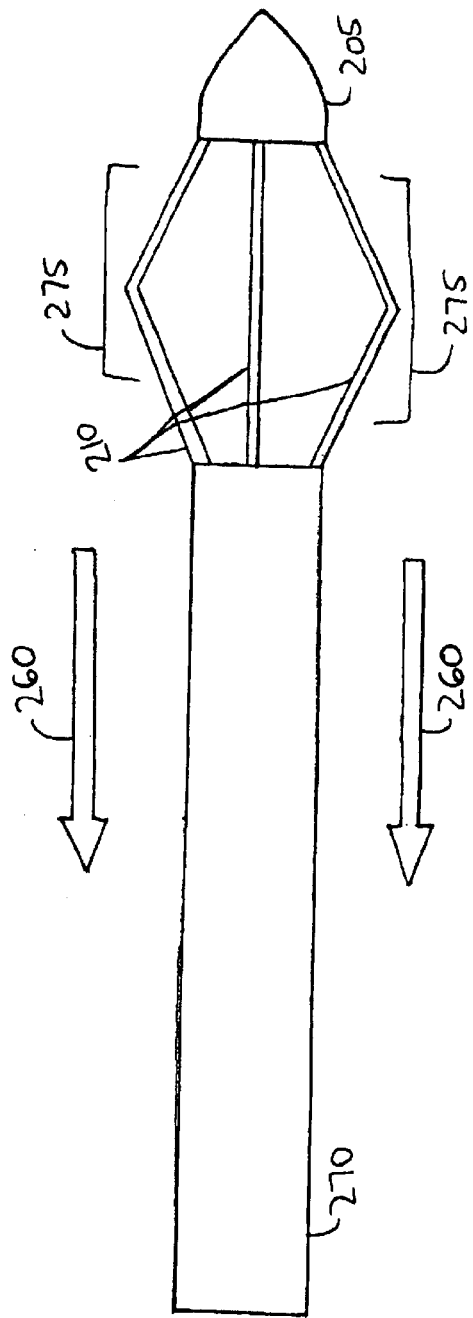
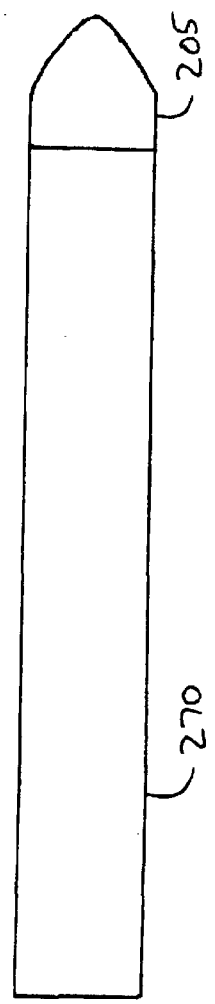
Fig. 7b
Fig. 7a

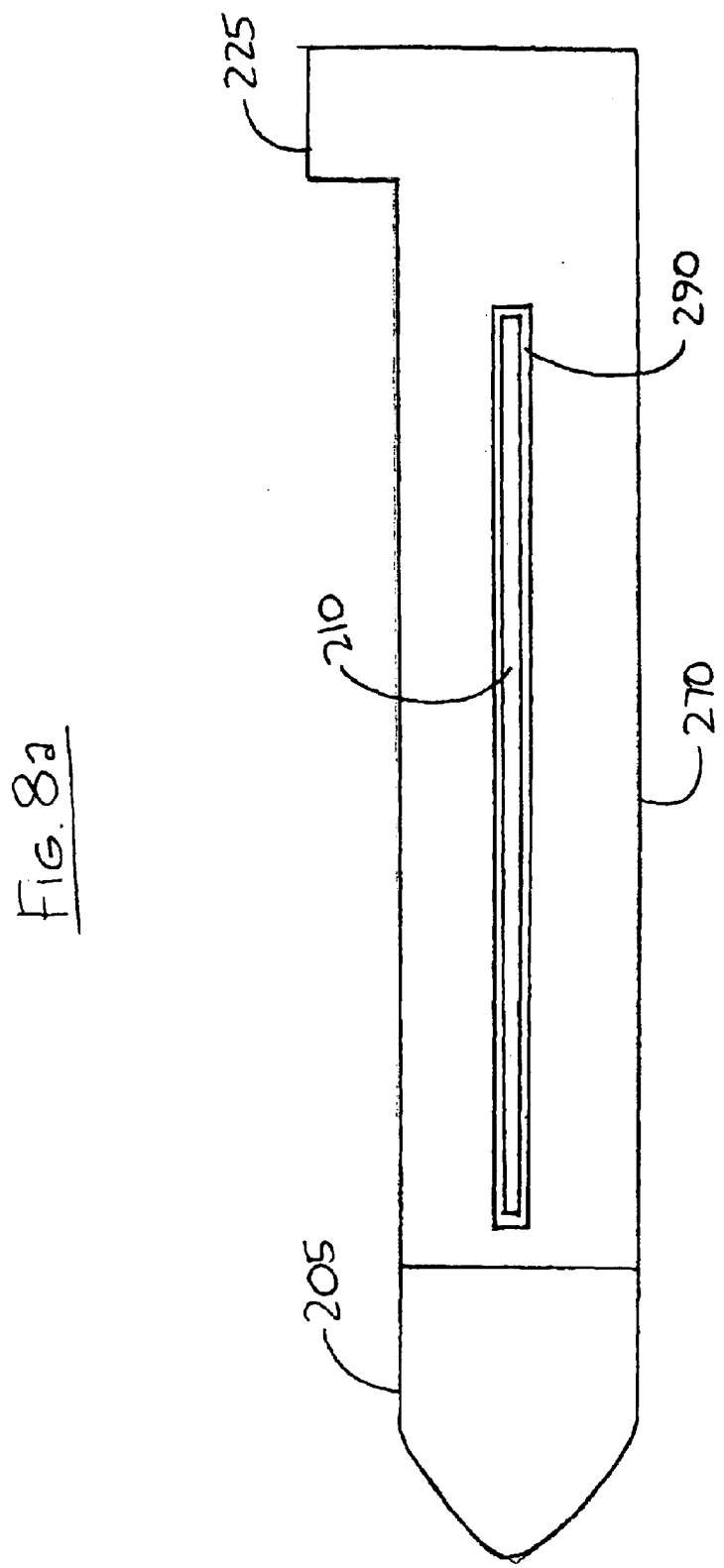

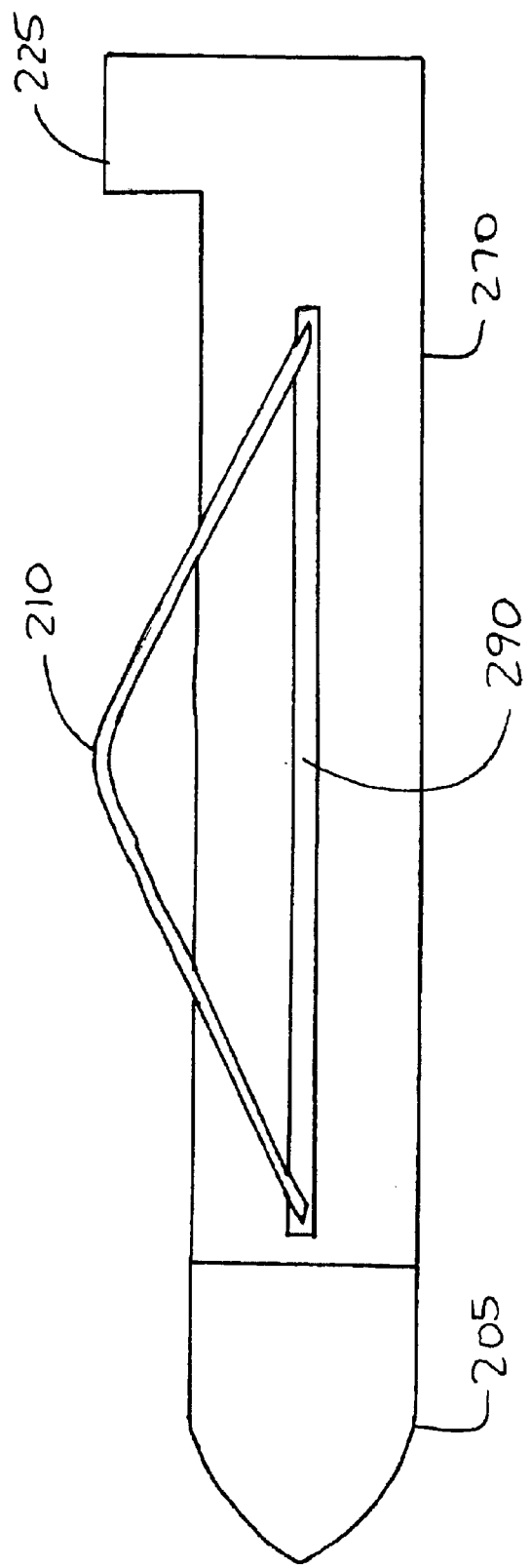

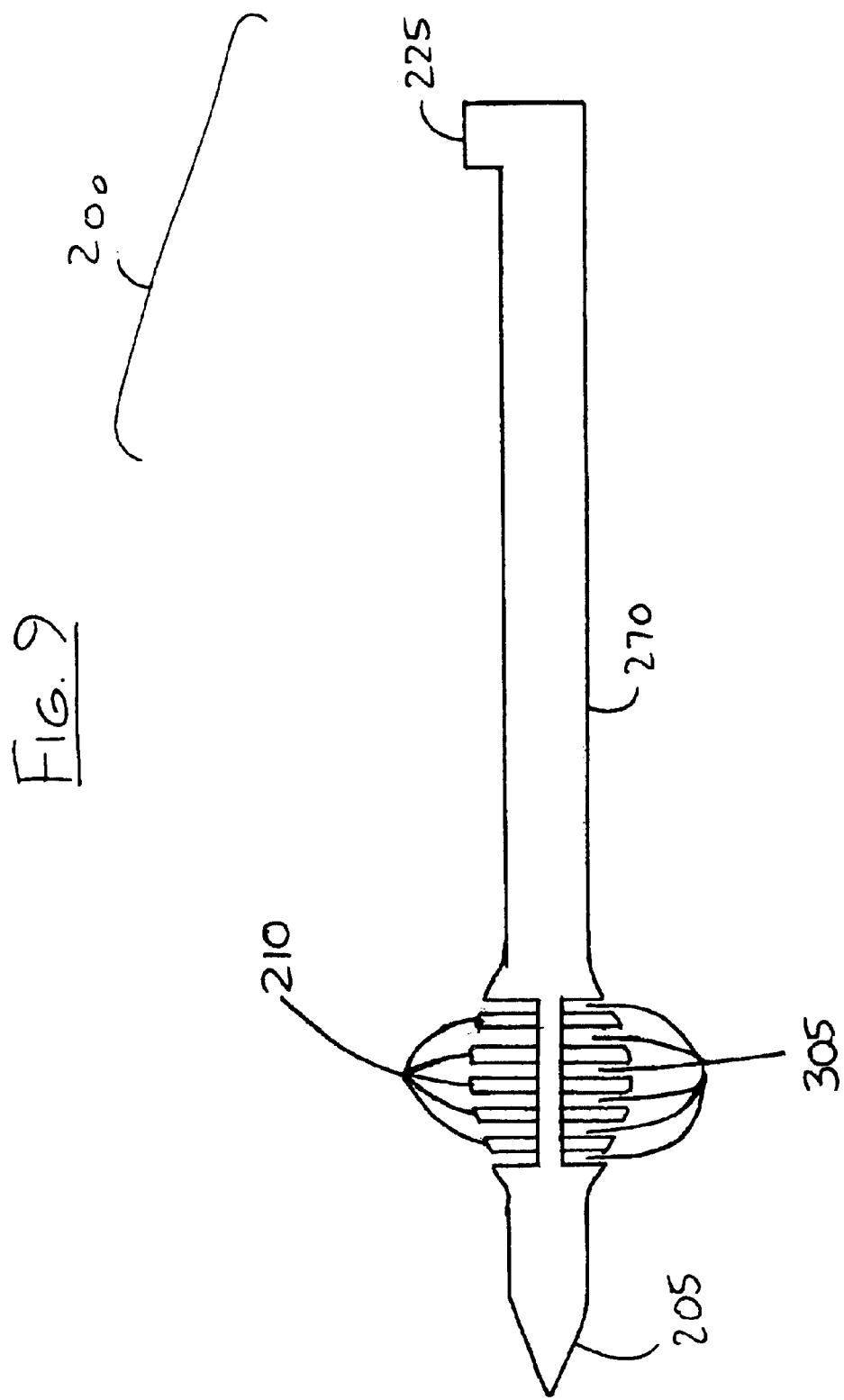

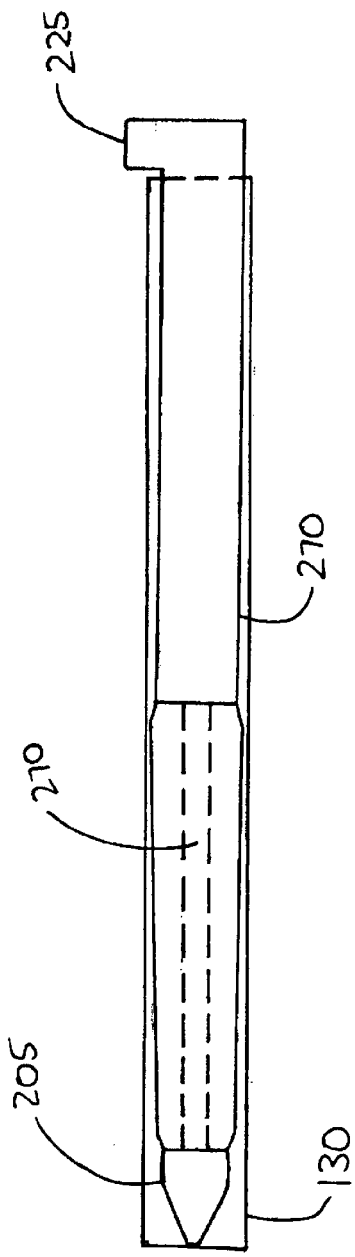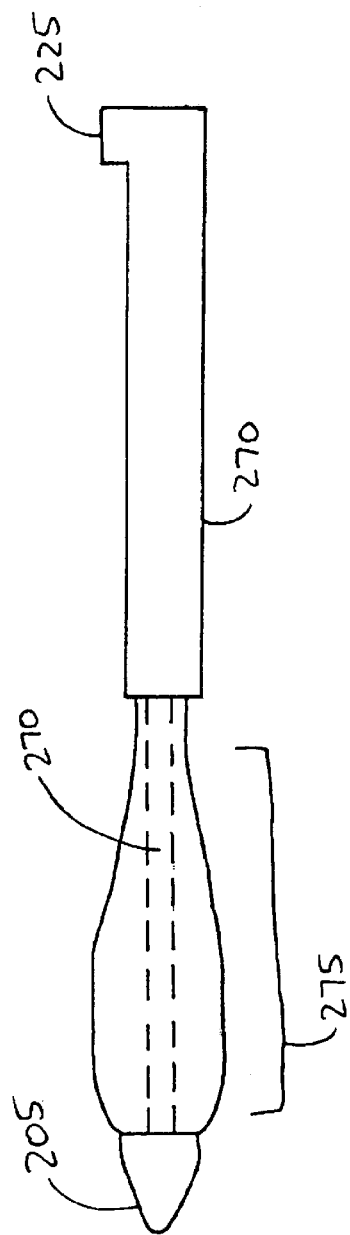
FIG. 10a
FIG. 10b

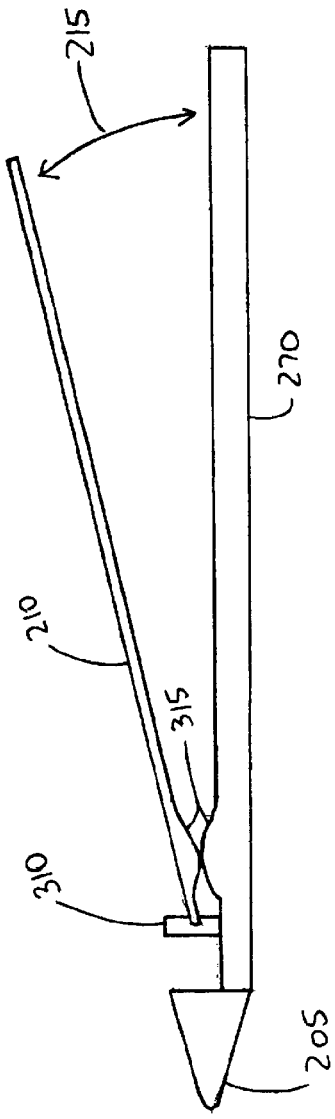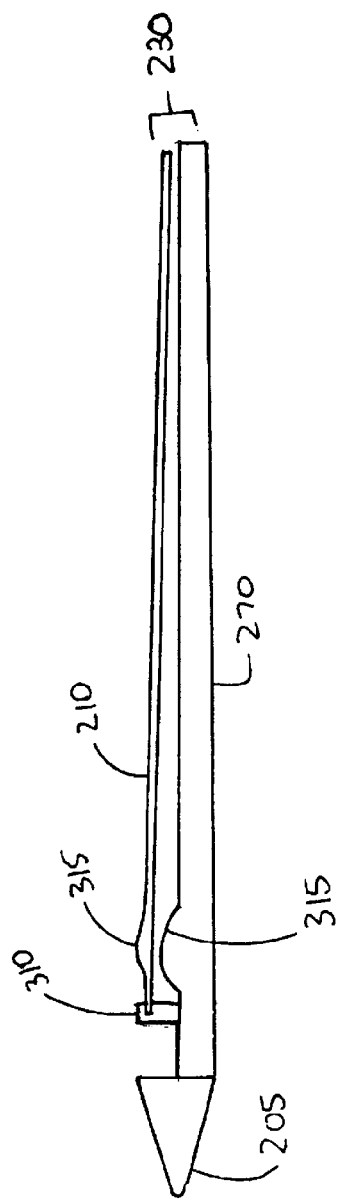

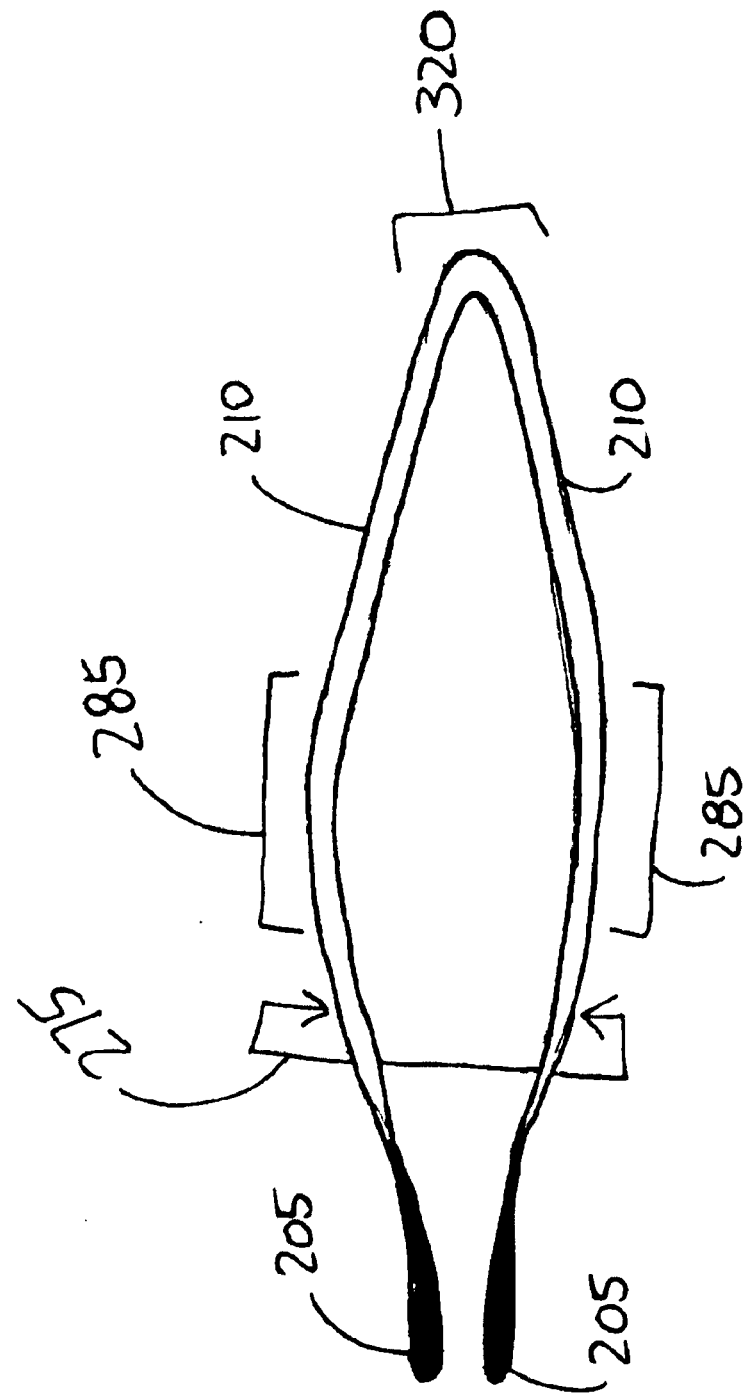

ERGONOMIC STYLUS STORABLE IN THE PEN SLOT OF A PERSONAL DIGITAL ASSISTANT

CROSS-REFERENCE TO RELATED APPLICATIONS:

This application is a continuation-in-part of application Ser. No. 10/352,358, filed by David M. Lilenfeld on Jan. 24, 2003.

REFERENCE TO MICROFICHE APPENDIX

Not applicable.

FEDERALLY SPONSORED RESEARCH AND DEVELOPMENT

Not applicable.

BACKGROUND OF INVENTION

1. Field of the Invention

The invention relates in general to a stylus for a Personal Digital Assistant ("PDA"), a tablet personal computer ("Tablet PC") and other computers with pen-based interfaces. The invention relates more particularly to an ergonomic stylus that is more convenient, more comfortable and ergonomically superior to styli known in the art, and which is storable in the pen slot of a pen-based computer.

2. Description of the Related Art

Today many people are in pursuit of high efficiency, causing them to change from conventional diaries, personal computers and notebook computers to more portable computer devices. Among these portable computer devices, the PDA is extremely popular. This is because the PDA is light-weight, easy to start, highly expandable and has a complete range of accessories allowing the users to install various kinds of application software to meet their needs. With a typical PDA, users can arrange schedules, search for contact information, browse outstanding appointments, take immediate memos, receive and send emails, play games and perform other tasks. Some PDAs are Internet-enabled and still others are combined with a cellular telephone. The latter type of a PDA is commonly referred to as a "smart phone."

The Tablet PC is another type of popular pen-based portable computer device. Tablet PCs can be used to perform the same functions performed by the PDA, as described above. Because the PDA is the most popular of these portable computers, this patent application most frequently refers to PDAs. However, it is understood that the invention disclosed herein is equally and likewise applicable to PDAs, Tablet PCs and other computers with a pen-based interface.

FIG. 1a shows a three-dimensional block diagram of a conventional PDA. The PDA 100 in FIG. 1a includes a base unit 105, a display panel 110 and control buttons 115.

Because the display panel 110 may be quite small and compact, it follows that the each of the microswitches on the panel is quite small and may be crowded quite closely together. Successfully entering a command into the PDA is dependent upon having a suitable instrument for contacting the screen in a limited area in a manner that will operate a selected microswitch, but will not operate other, adjacent microswitches inadvertently. Typically, computers with pen-based interfaces are sold with a stylus that is held in the user's hand and that may be placed in contact with the screen at a selected position to operate a microswitch to carry out a particular command. FIG. 1b shows such a prior art stylus 120 being held by a hand of a user. Users operate the PDA 100 by lightly touching the stylus 120 to the display panel 110.

The prior art stylus 120 (FIG. 1b) is stored in the base unit 105 by the user sliding it into the pen slot 130 along with the direction of an arrow 135 shown in FIG. 1a. Storing the pen thusly lessens the risk of the stylus being lost, makes the stylus readily accessible to the PDA user and provides for efficient storage of the stylus. The Tablet PC and other computers with pen-based interfaces have like pen slots that are identical in use and function as that described here in relation to the PDA.

As noted above, the PDA 100 is currently used for many different tasks. Also, as PDA technology continues to develop, people will become more reliant on their PDA and will use their PDA to perform a greater number of tasks. This will require the user to spend a greater amount of time operating their PDA 100.

Depending on the particular PDA, pen slots 130 range in internal circumference from 2/16 of an inch to 3/16 of an inch. Since prior art styli 120 must fit into the pen slot 130, they are narrower than 2/16 of an inch to 3/16 of an inch (see FIG. 1b). This results in styli too small to be comfortable to be held by the user for a prolonged period of time. When holding the stylus 120, the point of support for the user's hand is at the place grasping the stylus 120 with the fingers. The smaller the point of support, the greater pressure the user must apply to hold the stylus 120. The greater the pressure, the more strain and discomfort the user experiences in his or her hand. Therefore, holding the prior art stylus 120 requires a clenched hand position that is uncomfortable over prolonged periods, particularly for children, the elderly and persons with arthritis or handicaps. Moreover, such clenched positions can lead to various physical and neurological maladies, pain and discomfort, even in healthy people.

It is generally understood that wider points of support for the hand are healthier and more ergonomic. In addition to the prior art stylus 120 shown in FIG. 1b, ink pen/styli combination instruments are also known in the art. (E.g., Robb, U.S. patent application Ser. No. 9/805,617). While these devices tend to be wider than prior art styli, they are not designed for and are too large to fit within a pen slot 130. Because of this, such devices have the disadvantage of having to be stored outside the PDA, where they are more easily lost and forgotten. These devices also must be stored apart from the PDA, which is inefficient and inconvenient for the user.

BRIEF SUMMARY OF THE INVENTION

It is therefore an object of the current invention to provide personal digital assistant users, and users of other pen-based computers, with a single device which is both comfortable for use over a prolonged period and which is storable in the pen slot of a PDA or other pen-based computer.

According to the invention, an ergonomic stylus for a personal digital assistant, a tablet PC and other pen-based computer, is disclosed in the below-mentioned embodiments. Because of its novel design, users find the ergonomic stylus disclosed herein to be more convenient, more comfortably and healthier because the digits of the hand are more relaxed than with styli known in the art. At the same time, the current invention is convenient, efficient and less likely to be lost or forgotten because it is storable in the pen slot of the pen-based computer.

BRIEF DESCRIPTION OF THE DRAWINGS

FIG. 2b is a cut-away front view of the embodiment of the current invention shown in FIG. 2a while stored in the pen slot.

FIG. 7a is a view of another alternative embodiment of the current invention wherein a shaft is included, with said shaft being hollow, and one or more arms being housed within said shaft when the device is stored in the pen slot.

FIG. 7b is a view of the embodiment of the current invention shown in FIG. 7a wherein said shaft is slid back to expose the arms and put them into an open position.

FIG. 8a is a view of another alternative embodiment of the current invention which includes a shaft, with said shaft containing one or more recesses, and arms such that when the stylus is stored in the pen slot, said arms are buried into said recesses.

FIG. 8b shows the embodiment of the current invention shown in FIG. 8a, but with the current invention being removed from the pen slot, so that the arms protrude from said recesses.

FIG. 9 shows another embodiment of the current invention which includes a shaft and a plurality of arms made of a pliant material. This view shows this embodiment removed from the pen slot.

FIG. 10a shows another embodiment of the current invention, which includes a shaft, a tip, an end piece and a gripping area made of a pliant material and disposed over said shaft, while inside the pen slot.

FIG. 10b shows the embodiment of FIG. 10a, with the current invention removed from the pen slot which provides an expanded gripping area.

FIG. 11a shows another embodiment of the current invention with a shaft, a tip, a pivot pin and an arm in which said arm is attached to said pivot pin and is in a closed position.

FIG. 11b shows the embodiment of FIG. 11a in which said arm is in an open position, for use when the device is removed from the pen slot.

FIG. 12 shows another embodiment of the current invention in which two arms are connected to each other with a bight portion.

DETAILED DESCRIPTION OF THE INVENTION

Figure 1A:
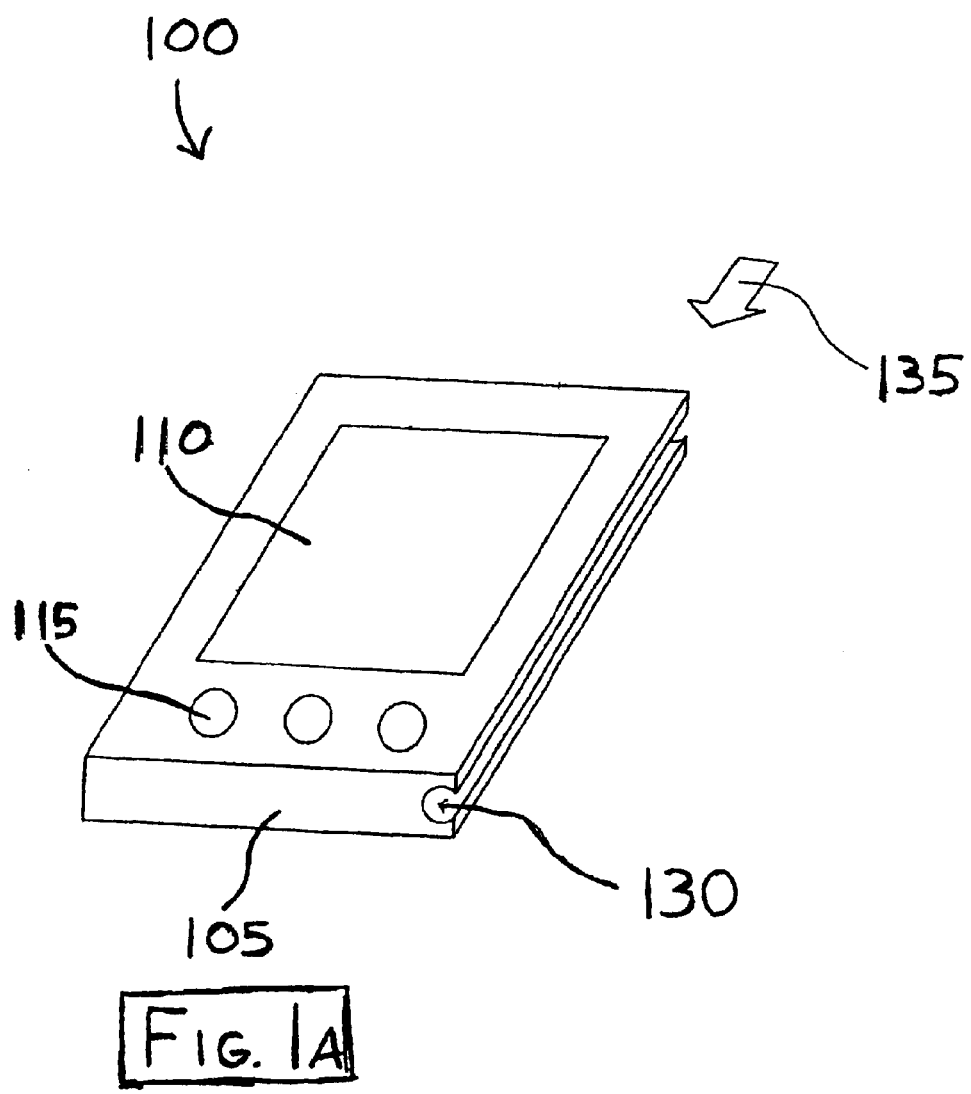
FIG. 1a is a three-dimensional block diagram of a conventional PDA.
Figure 1B:
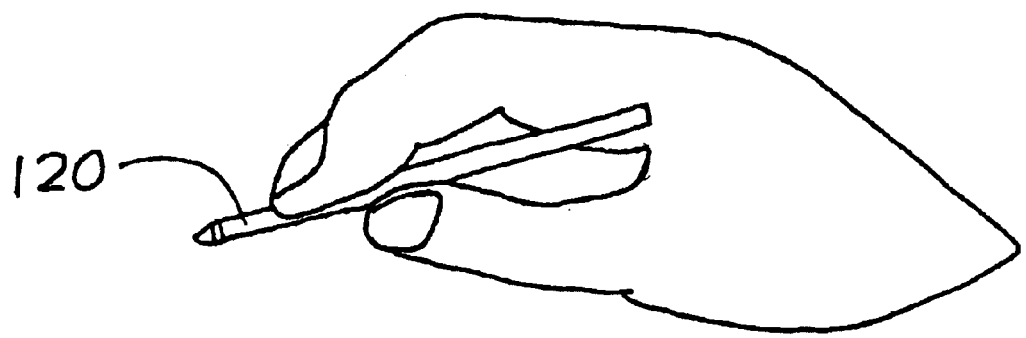
FIG. 1b shows a prior art stylus.

FIG. 1a shows a personal digital assistant 100 and FIG. 1b shows a prior art stylus 120 while held in a user's hand.

Figure 2A:
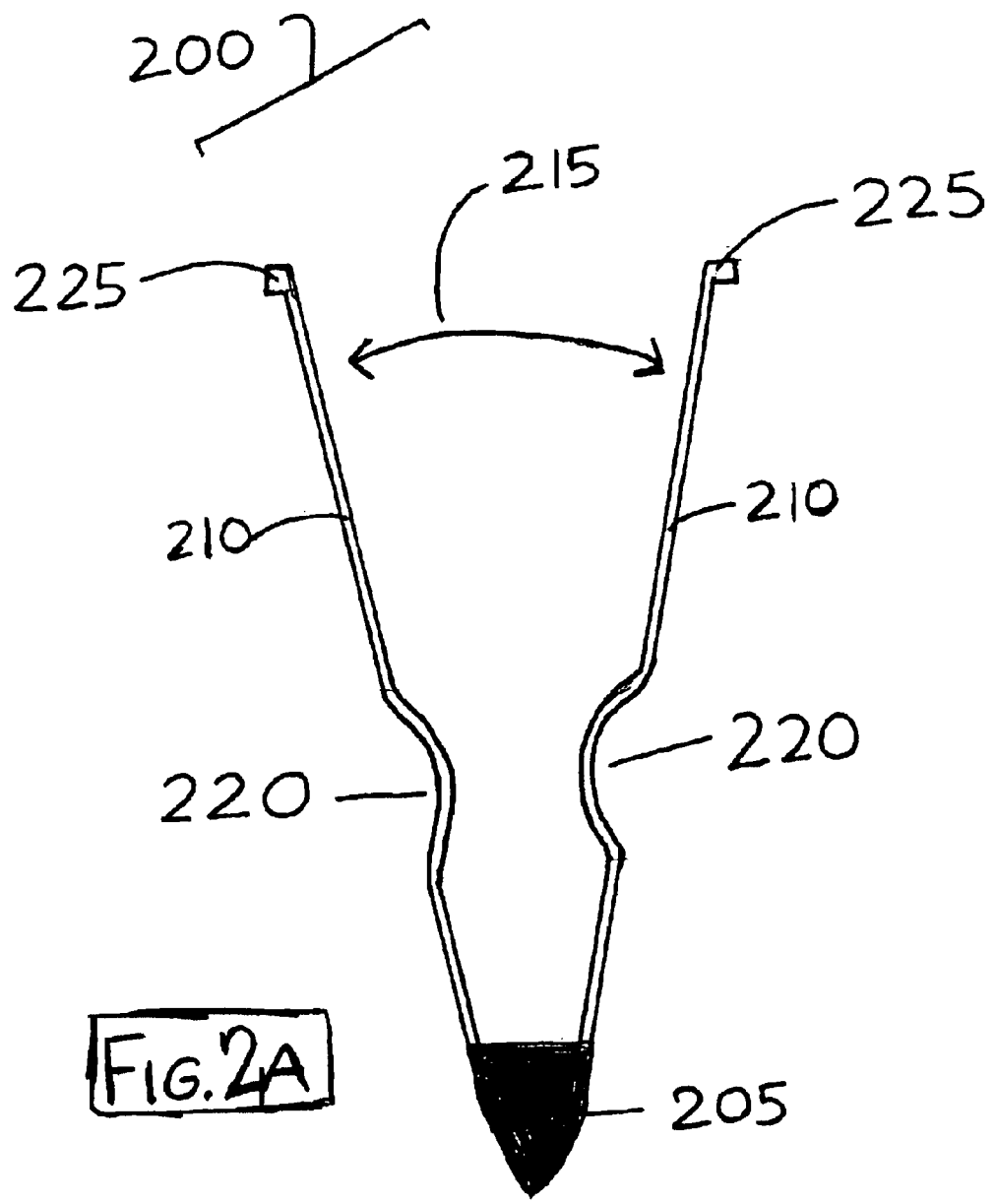
FIG. 2a is a front view of one embodiment of the current invention when removed from the pen slot.

FIG. 2a shows one preferred embodiment of the current invention. In FIG. 2a, the current invention is removed from the pen slot 130. In this embodiment, the ergonomic stylus 200 consists of a tip 205 and one or more arms 210 blended smoothly with, or joined to, the tip 205. The arms 210 in this embodiment are preloaded together with a predetermined amount of resilient force such that they reflexively assume and maintain an open position 215 when removed from the pen slot 130 (FIG. 1a). The arms 210 are made of a material that allows the user to apply varying amounts of pressure easily, but once the pressure is released, the arms 210 reflexively return to the open position 215. Such material may be a pliant metal, flexible plastic, hard rubber or the like.

In addition to, or instead of, preloading the arms with a predetermined amount of resilient force, as described in the preceding paragraph, other methods can be used to cause the arms 210 to reflexively assume and maintain an open position when the current invention is removed from the pen slot 130. Those methods include energy or tension created during construction by the disposition of the arms 210 in relation to the tip, or by including between the arms a torsion spring, compression spring, flat spring, bar spring, other spring or stamped piece. All of these methods are capable of returning the arms 210 to their original position when the stylus 200 is removed from the pen slot, but it is understood that other methods may be suitable for this purpose and that such other methods are included in this disclosure.

In the preferred embodiments of the current invention, when in an open position 215 (i.e., when removed from the pen slot 130), the separation of the arms 210 provides an ergonomic gripping area 275 ranging in width from ⅟16 of an inch to one inch. Thus, the current invention provides a wider and therefore more natural and ergonomic gripping and holding position for the user's hand than the prior art styli. Moreover, when in a closed position 230, the current invention fits into the pen slot 130 (FIG. 1a) and is storable therein.

While FIG. 2a shows two arms 210, it is understood that more than arms 210 may be used. Also shown in FIG. 2a are end pieces 225 which may be included to provide a slight protrusion which the user may grasp to remove the ergonomic stylus 200 from the pen slot 130. In some or all embodiments of this invention, no or one end piece 225 may be included at the distal end of each arm 210.

FIG. 2b shows the embodiment in FIG. 2a, except that in FIG. 2b the ergonomic stylus 200 is in a closed position 230 so that it may be stored in the pen slot 130.

Figure 3:
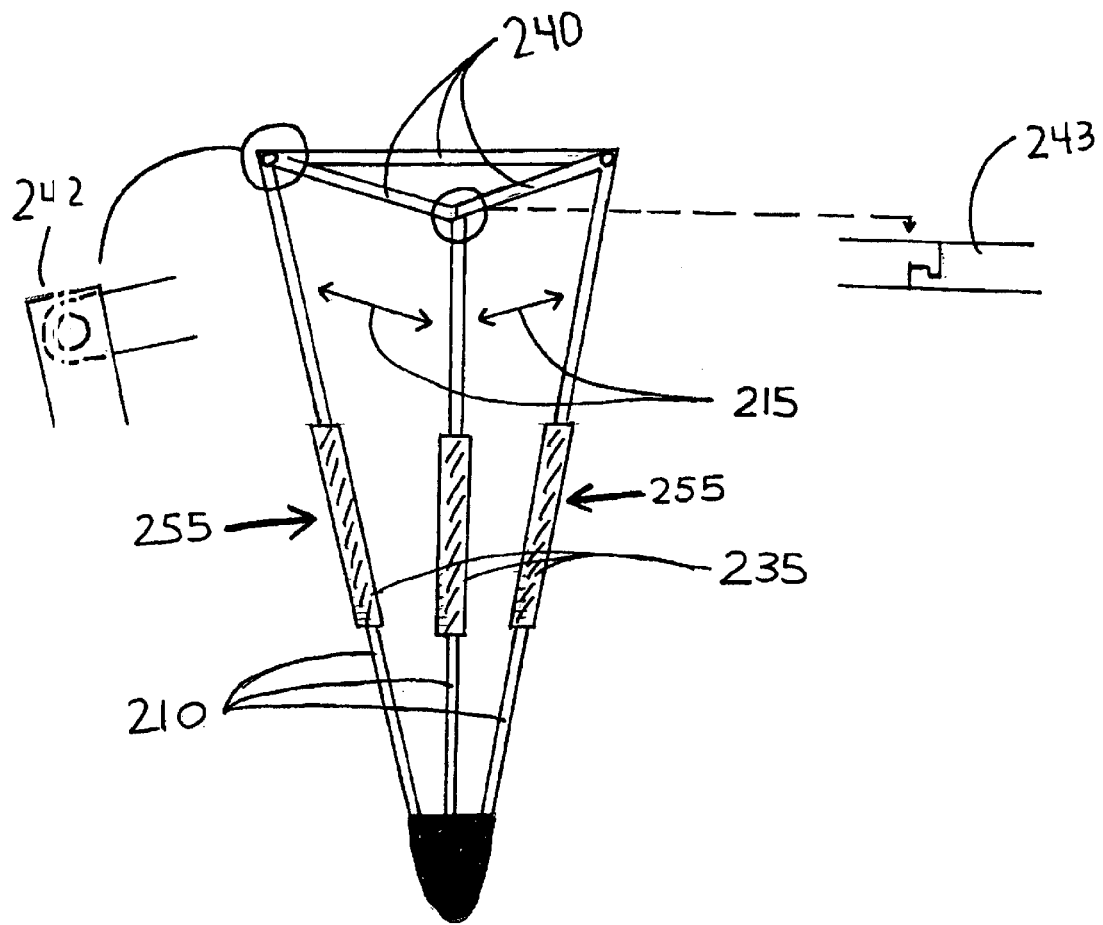
FIG. 3 is a front view of an alternative embodiment of the current invention showing three arms while said stylus is removed from the pen slot.

FIG. 3 shows an embodiment of the current invention with three arms 210 while in an open position 215. It is understood that less or more than three arms 210 may be included in other embodiments, although the number and size of the arms 210 are limited to ensure that the stylus 200 fits in the pen slot 130 when in a closed position 230.

Also shown in FIG. 3 is one or more grip pads 235 joined to the arms 210, which may be included in one or more embodiments of the current invention 200. The grip pads 235 add comfort and assist the user's fingertips while gripping and holding the ergonomic stylus 200. The grip pads 235 may be made of a variety of materials, including, but not limited to, rubber, thermoplastic elastomer, soft plastic, a material with an abrasive characteristic or other suitable material.

Further shown in FIG. 3 is a plurality of braces 240 and a means for attaching each brace 243 to one or more arms 210. One such means is a hinge 242. The brace 240 forces the arms 210 to maintain an open position 215 even when inward pressure 255 is applied to the arms 210 by the user. Instead of a brace 240, other means may be used for the arms to assume and maintain an open position 215 when the current invention 200 is removed from the pen slot 130, as those described in connection with FIG. 2a, above.

Figure 4A:
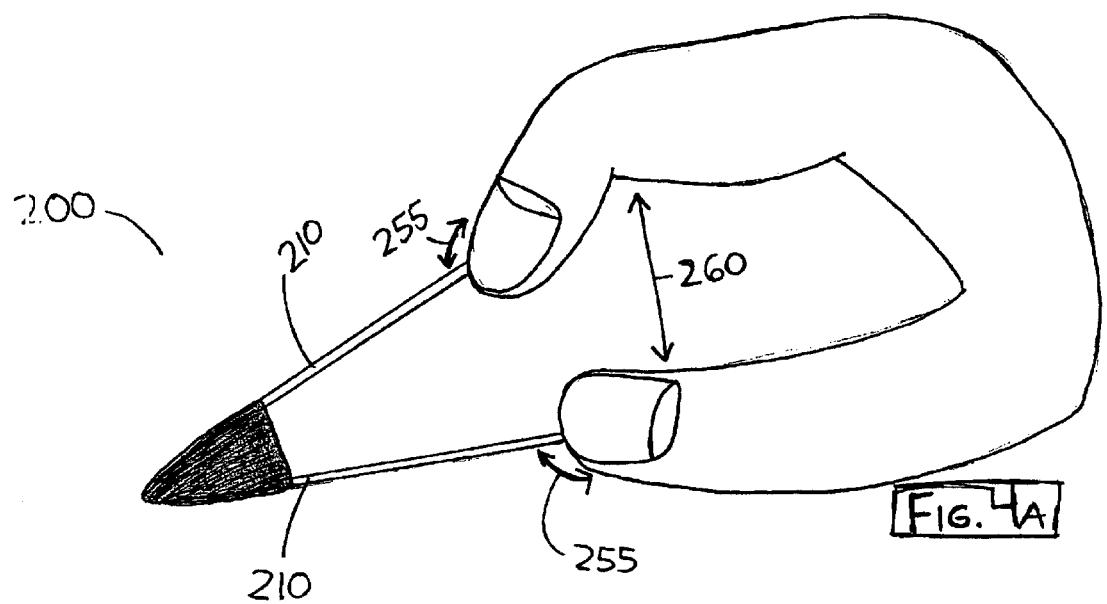
FIG. 4a is a view of one embodiment of the current invention being gripped by the hand of a user.

FIG. 4a shows one use of the ergonomic stylus 200. In FIG. 4a, the ergonomic stylus 200 is gripped by one or more fingers or the thumb (hereinafter collectively referred to as "digits"). When gripping the ergonomic stylus 200, the user may apply varying degrees of inward pressure 255 to the outer sides of the arms 210. The arms 210 provide an ergonomic gripping area 275, rather than in the tightly clenched hand position as is required by styli known in the art 120 (See FIG. 1b).

Figure 4B:
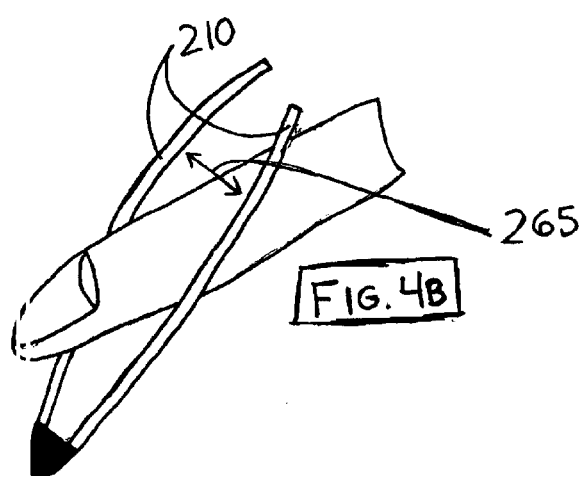
FIG. 4b is a view of the embodiment of the current invention shown in FIG. 4a while being used by one finger of a user.

FIG. 4b shows another use of one embodiment of the current invention. In FIG. 4b, the user's digit is placed between the arms 210 thereby applying outward pressure 265 to the arms 210. Because of the rigidity of the arms 210 the arms 210 will gently tighten against the user's digit and maintain this position without being held by the user and without being otherwise supported. Use of grip pads 235 (see FIG. 3) would provide additional tension and friction to keep the current invention in the position shown in FIG. 4b. Using the ergonomic stylus 200 in this manner allows for hands-free data entry into the PDA 100 since the current invention does not need to be held by the user. Again, more than two arms 210 may be used in this embodiment as is also true of the embodiments disclosed above.

Figure 5A:
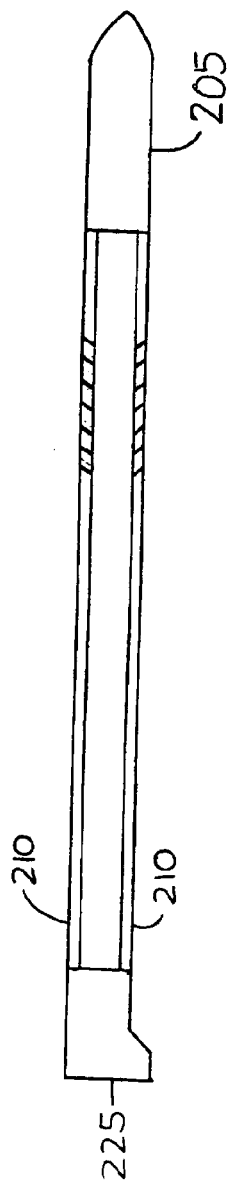
FIG. 5a is a view of an alternative embodiment of the current invention in which the arms are joined to a tip and to an end piece, wherein said arms are in the closed position for storage in pen slot.
Figure 5B:
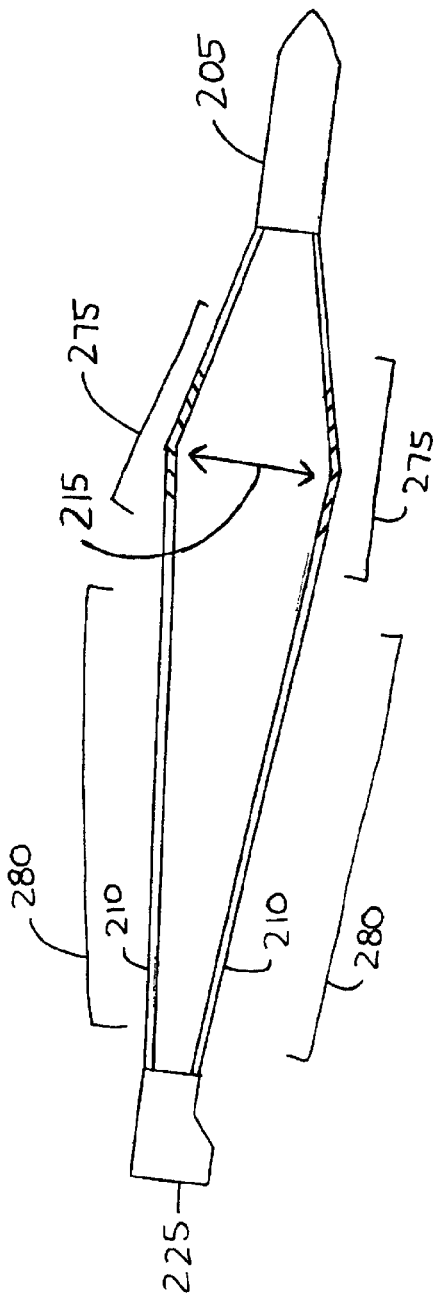
FIG. 5b is a view of the embodiment of the current invention shown in FIG. 5a, but with said arms being in an open position which occurs when the stylus is removed from the pen slot.

FIG. 5a shows an alternative embodiment of the current invention consisting of a tip 205, two arms 210 and an end piece 225. As shown, the arms 210 assume a closed position 230 for storage in the pen slot. FIG. 5b shows the same stylus 200 removed from the pen slot 130 so that the arms 210 reflexively assume and maintain an open position 215 through a means described above in connection with FIG. 2a. For this and the other embodiments described herein, each arm 210 is comprised of an ergonomic gripping area 275 and a stabilizing portion 280.

The stabilizing portion 280 provides a surface against which the user's hand may rest to stabilize the stylus 200. The gripping area 275 created by the open position 215 of the arms 210 is wider than what is known in prior art stlyi 120 and thus, more ergonomic. In this, or any of the embodiments disclosed above, the gripping area 275 may be made of, or may include, a variety of materials such as semi-soft rubber, soft rubber, foam rubber, low density foam, thermoplastic elastomer, sponge or gel, all of which may include an abrasive characteristic to assist the user with holding the stylus 200 and prevent slippage between the stylus and the user's fingers.

Figure 6A:
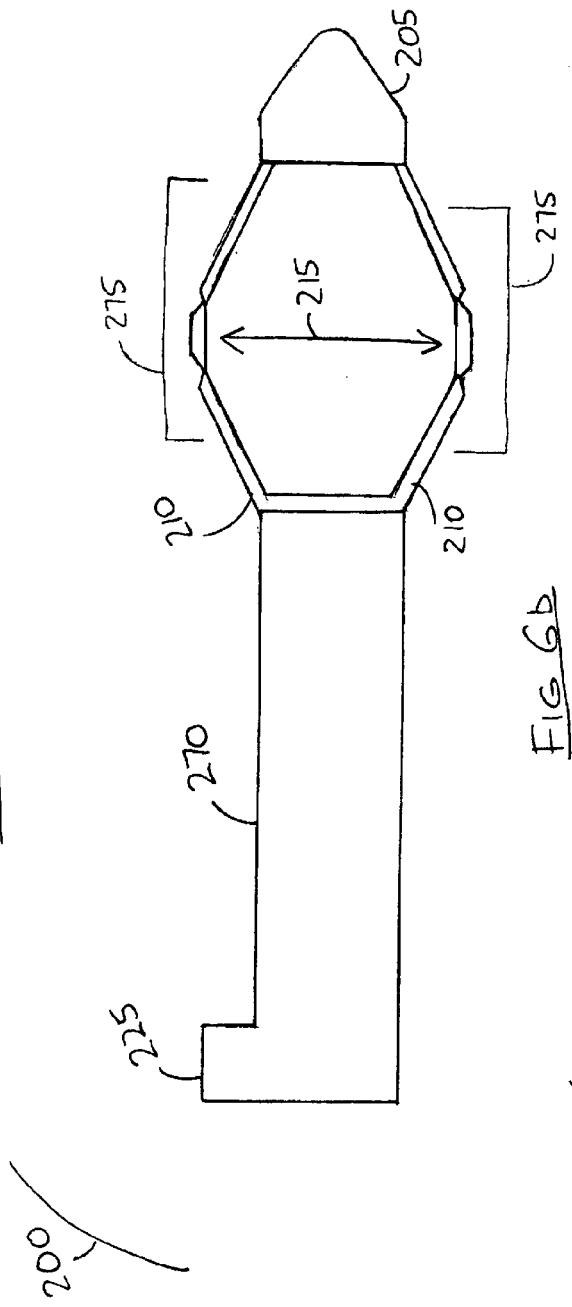
FIG. 6a is a view of an alternative embodiment of the current invention in which the arms connect a shaft to a tip, wherein said arms are in a closed position for storage in a pen slot.
Figure 6B:
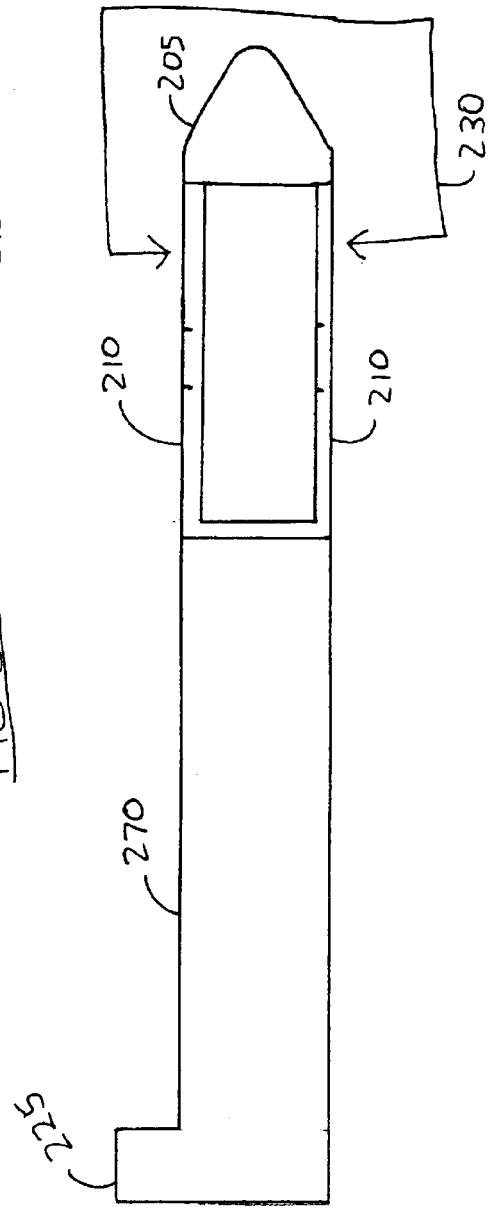
FIG. 6b is a view of the embodiment shown in FIG. 6a in which said arms are in an open position, which occurs when the stylus is removed from the pen slot.

FIGS. 6a and 6b show another alternative embodiment in which the current invention 200 consists of a tip 205, a shaft 270, two arms 210 and an end piece 225. The arms 210 connect the shaft 270 and the tip 205. FIG. 6a shows this embodiment with its arms 210 in its closed position 230 for fitting in the pen slot 130. FIG. 6b shows this embodiment with the arms 210 in an open position 215, which it will reflexively assume and maintain when removed from the pen slot 130 by a method described in connection with FIG. 2a, above. When so removed, the arms 210 provide a gripping area 275 wider and therefore more comfortable and ergonomic than is known in the art 120. Again, as is true with all the embodiments disclosed above, the embodiment shown in FIGS. 6a and 6b may contain two or more arms 210, as long as the stylus 200 remains sized to fit within the pen slot 130.

FIG. 7a shows yet another alternative embodiment of the current invention 200. In this embodiment the shaft 270 is hollow and stores the arms 210 when the current invention 200 is placed in the pen slot 130. When removed from the pen slot 130, as shown in FIG. 7b, the user may slide the shaft 270 downward in the direction of the arrows 260 (i.e., away from the tip 205) along the arms 210. This sliding exposes the arms 210 and permits them to reflexively assume and maintain an open position 215, thereby creating an ergonomic gripping area 275.

FIG. 8a shows an alternative embodiment of the current invention which includes a shaft 270 that contains one or more recesses 290. When said stylus 200 is in the pen slot 130 each arm 210 is forced by the inside of the pen slot into a closed position 230 such that each arm 210 is stored in a recess 290 of the shaft 270.

FIG. 8b shows another view of the embodiment described in FIG. 8a. FIG. 8b shows that when this embodiment is removed from the pen slot 130, a portion of each arm 210 reflexively protrudes from said recess 290 to an open position 215 through a method described above, in connection with FIG. 2a. This provides an ergonomic gripping area 275.

FIG. 9 is another embodiment of the current invention 200 consisting of a tip 205, a shaft 270 and a plurality of arms 210 that create an ergonomic gripping area 275 disposed over the shaft 270. The arms 210 in this embodiment extend parallel to one another and in a plane perpendicular to the shaft 270. The arms 210 are disposed next to each other but are separated by air gaps 305, thereby creating space for the arms 210 to bend or fold when placed in the pen slot 130. In this embodiment, the arms 210 are made of a resilient and flexible material such as semi-soft rubber material.

FIG. 10a is an alternative embodiment of the current invention 200 in which, instead of arms, the gripping area 275 is a pliant material such as a viscoelastic gel material. The gel may be made of a non-foam elastomer such as the class of materials known as viscoelastic polymers or silicone gels. Because the mechanical properties of the gel are more viscous than elastic, the gel is highly shapeable. This allows the gel to narrow as the stylus 200 is placed into the pen slot. When removed from the pen slot, the material returns to its original shape thereby creating an ergonomic gripping area 275 which is wider that found in the than prior art.

It is understood that materials other than gel could be used to create a compressible gripping area 275, such as foam rubber, low density foam, sponge or other material that will contract when placed in the pen slot 130 and expand when removed from the pen slot 130. The gripping area 275 can be various shapes including a rectangle, hourglass, square, triangle and the like.

FIG. 11 is yet an another alternative embodiment of the current invention 200 comprised of a shaft 270 and an arm 210 both of which are attached to a pivot pin 310. The arm 210 is attached to the pivot pin 310 such that the arm 210 is moveable from a closed position 230, as shown in FIG. 11a, to an open position 215, as shown in FIG. 11b. A stud 315 on the arm 210 corresponds to a stud 315 on the shaft 270 such that, when in the open position 215 the studs 315 bear against each other, creating a space between the arm 210 and the shaft 270. This provides which creates an ergonomic gripping area 275 not known in the prior art 120.

To allow this embodiment to be stored in the pen slot 130, the pivot pin 310 allows the user to move the arm 210 such that the stud 315 on the arm 210 no longer bears against the stud 315 on the shaft 270. This allows the arm 210 to close against the shaft 270, thereby narrowing the stylus 200 for fitting within the pen slot 130. It is understood that alternatively one stud 315 could be employed in this embodiment and that said stud 315 could be disposed on either the arm 210 or the shaft 270.

FIG. 12 is another alternative embodiment of the current invention 200 comprised of two tips 205 and two arms 210 having a V-shaped construction connected through a bight portion 320. The arms 210 have bulbous portions 285 and are preloaded together with a predetermined amount of resilient force whereby the arms 210 provide an ergonomic gripping area 275 when the device 200 is removed from the pen slot. The arms 210 may also be secured together by spot welds or other means. The user may use either or both tips 205 to activate the display panel 105 (FIG. 1a).

According to the current invention 200, a stylus for computers with pen-based interfaces is disclosed in the above-mentioned embodiments. Its design allows users to use the stylus for prolonged periods of time without having to maintain a clenched hand position as is necessary with the styli known in the art 120 and also allows for the stylus to be stored in the pen slot 130. (See FIG. 1b). Clenched hand positions, particularly over prolonged periods of time, can lead to various physical and neurological maladies, pain and discomfort. Thus, users find the ergonomic stylus disclosed herein to be more convenient, more comfortable and healthier because the digits of the hand are more relaxed than with styli known in the art.

The current invention also facilitates its handling by children, senior citizens who may suffer from arthritis or people with handicap. At the same time, the current invention is storable in the pen slot 130, thereby greatly reducing the risk of being lost or forgotten and eliminating the inefficiency of the stylus being stored, carried or transported outside the pen slot. Also, because the current invention fits in the pen slot it does not interfere with cases for carrying the PDA.

Those who are familiar with the skills and technology of the invention will understand that the invention is not limited to the disclosed embodiments. For instance, all or part of the ergonomic stylus can be made in a variety of materials, the tip can be made of a pliant material or fitted with a hinge, swivel or similar-mechanism so that its angle in relation to the body may be manually adjusted by the user according to his or her preference. By way of further example, the ergonomic stylus, and each of its components, can be of varying lengths, widths, circumference, sizes and colors while still accomplishing the advantages described herein. Also, it is understood that one may find ways to hold or use the current invention to accomplish its ends in ways not expressly described herein.

It is also understood that the current invention may be used with various types of writing units, such as fountain pens, fiber tip markers, pencils and the like.

What I claim as my invention is:

1. A stylus for a pen-based computer comprising:
   a body;
   a tip on said body; and
   two or more arms on said body which reflexively assume a spread position when removed from a pen slot of said pen-based computer and maintain a pinched position when stored in said pen slot.

2. The device of claim 1, further comprising:
   one or more phalanges.

3. The device of claim 1, further comprising:
   one or more grip pads joined to said arms.

4. The device of claim 1, further comprising:
   one or more stabilizers to assist said arms in maintaining a spread position when the stylus is removed from the pen slot.

5. The device of claim 1, further comprising:
   a hinge to join each stabilizer to an arm and a mechanism for temporarily attaching the stabilizer to a second arm.

6. The device of claim 1, wherein said tip is made of a pliable material so that the angle of said tip can be adjusted according to user preference.

7. The device of claim 1, further comprising:
   end pieces joined to said arms.

8. The device of claim 1, further comprising:
   a hollow shaft connected by said arms to said tip, which is slidable and in which said arms are stored when said stylus is placed in the pen slot of a pen-based computer.

9. The device of claim 1, further comprising:
   a pivot pin.

10. A stylus for a pen-based computer comprising:
    a tip:
    a shaft with one or more recesses;
    two or more arms which recede into a corresponding recess when said stylus is placed in a pen slot and said arms protrude from said recesses when said stylus is removed from said pen slot.

11. A stylus for a pen-based computer comprising:
    a tip:
    a shaft;
    a gripping area which is made of a pliant material which contracts when placed in a pen slot of a personal digital assistant and expands when removed from said pen slot.

* * * * *